United States Patent
Soma et al.

(10) Patent No.: US 11,159,978 B2
(45) Date of Patent: Oct. 26, 2021

(54) ADAPTIVE MULTI-LINK CONTROL

(71) Applicant: Dell Products, L.P., Round Rock, TX (US)

(72) Inventors: Dileep Kumar Soma, Austin, TX (US); Kamal Joseph Koshy, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 94 days.

(21) Appl. No.: 16/774,441

(22) Filed: Jan. 28, 2020

(65) Prior Publication Data
US 2021/0235311 A1 Jul. 29, 2021

(51) Int. Cl.
*H04W 28/02* (2009.01)
*H04W 24/08* (2009.01)
*H04L 12/26* (2006.01)
*H04W 84/12* (2009.01)

(52) U.S. Cl.
CPC ..... *H04W 28/0268* (2013.01); *H04L 43/0841* (2013.01); *H04L 43/0864* (2013.01); *H04W 24/08* (2013.01); *H04W 84/12* (2013.01)

(58) Field of Classification Search
CPC . H04W 28/0268; H04W 24/08; H04W 84/12; H04L 43/0864; H04L 43/0841
See application file for complete search history.

(56) References Cited

U.S. PATENT DOCUMENTS

| | | | |
|---|---|---|---|
| 2015/0056960 A1* | 2/2015 | Egner | H04W 4/029 455/411 |
| 2017/0251467 A1* | 8/2017 | Dame | H04L 5/0005 |
| 2018/0013541 A1* | 1/2018 | Huang | H04L 7/0012 |
| 2018/0167825 A1* | 6/2018 | Egner | H04W 28/08 |
| 2018/0270139 A1* | 9/2018 | Singh | H04L 12/64 |
| 2019/0014024 A1 | 1/2019 | Koshy | |
| 2019/0158385 A1* | 5/2019 | Patil | H04W 40/244 |
| 2019/0158413 A1* | 5/2019 | Patil | H04W 88/06 |
| 2019/0245810 A1 | 8/2019 | Gulbay et al. | |

(Continued)

OTHER PUBLICATIONS

IEEE: Scalable Service Guarantees through Stochastic Modeling for Bandwidth Aggregation of Multiple Wireless Links during Mobility; Syed Zubair Ahmad, Muhammad Saeed Akbar, Samiullah Khan Mohammad Ali Jinnah University, Islamabad. (Year: 2011).*

(Continued)

*Primary Examiner* — Hassan A Phillips
*Assistant Examiner* — Mohammed S Chowdhury
(74) *Attorney, Agent, or Firm* — Fogarty LLP

(57) ABSTRACT

Systems and methods for adaptive multi-link control are described. In some embodiments, an Information Handling System (IHS) may include a processor and a memory coupled to the processor, the memory having program instructions stored thereon that, upon execution, cause the IHS to: determine that a first communication link is under contention; compare a first quality-of-service (QoS) indicator of the first communication link with a second QoS indicator of the second communication link, at least in part, in response to the determination; and aggregate the first and second communication links, at least in part, in response to the second QoS indicator being equal or superior to the first QoS indicator.

18 Claims, 4 Drawing Sheets

(56) References Cited

U.S. PATENT DOCUMENTS

2020/0229078 A1\* 7/2020 Shin .................... H04W 72/085

OTHER PUBLICATIONS

IEEE: QoS Based Aggregation in High Speed IEEE802.11 Wireless Networks, Seyed Vahid Azhari y, Ozgur Gurbuzy, Ozgur Ercetiny School of Computer Engineering, Iran University of Science and Technology, Tehran. (Year: 2016).\*
IEEE: A Flow Aggregation Method for the Scalable and Efficient Quality of Service Support in Next Generation Networks; Mustafa Sanli, Ece Guran Schmidt & Hasan Cengiz Guran. (Year: 2013).\*
Z. Weng, et al., "Classification of Wireless Interference on 2.4GHz Spectrum," TR2014-018, Apr. 2014, 8 pages, Mitsubishi Electric Research Laboratories, Inc., Cambridge, Massachusetts, USA.

\* cited by examiner

ADAPTIVE MULTI-LINK CONTROL

FIELD

This disclosure relates generally to Information Handling Systems (IHSs), and more specifically, to systems and methods for adaptive multi-link control.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks. Generally, client IHSs establish communication through a network to a server IHS to retrieve and store information. Different types of networks support different types of communication at different data transfer rates. For example, a conventional client IHS may communicate with a local area network (LAN) through a wired Ethernet communication, such as through a CAT 5 cable, through a USB or other serial cable, or through a variety of wireless communication protocols, such as a wireless local area network (WLAN) or a wireless wide area network (WWAN). In an enterprise or residential network, client IHSs access networks through access points, such as with wireless or Ethernet interfaces (e.g., an Internet router interface).

Typically, applications executing on a client IHS use a single network interface to communicate with external networks. For example, an Internet browser executing on a client IHS establishes a network interface through a WLAN and uses the WLAN for communication with the network. Although other types of network interfaces are available, such as an Ethernet LAN interface or a WWAN interface, the application relies upon only one network interface to communicate with an external network.

Other applications may support multiple network interfaces. In those cases, network traffic is divided by application so that a selected application, such as a game that uses network communication, has all of the bandwidth of one network interface available, such as an Ethernet interface, while other applications share a separate network interface, such as a WLAN. These applications effectively increase network bandwidth at a client IHS by allowing simultaneous connections over multiple links.

As the inventors hereof have recognized, however, conventional link aggregation techniques lack the ability to adaptively determine when to use single or multiple links. To address these, and other problems, the inventors hereof have developed systems and methods for adaptive multi-link control described herein.

SUMMARY

Embodiments of systems and methods for adaptive multi-link control are described. In an illustrative, non-limiting embodiment an Information Handling System (IHS) may include a processor and a memory coupled to the processor, the memory having program instructions stored thereon that, upon execution, cause the IHS to: determine that a first communication link is under contention; compare a first quality-of-service (QoS) indicator of the first communication link with a second QoS indicator of the second communication link, at least in part, in response to the determination; and aggregate the first and second communication links, at least in part, in response to the second QoS indicator being equal or superior to the first QoS indicator.

In some cases, the first and second communication links may be of different types selected from the group consisting of: a WiFi link, an Ethernet link, and a cellular link. To determine that the first communication link is under contention, the program instructions, upon execution, may cause the IHS to compare the first QoS indicator against a contention threshold.

The first QoS indicator may include a first latency of the first communication link, the second QoS indicator may include a second latency of the second communication link, and the second QoS may be equal or superior to the first QoS indicator if the first latency is equal to or greater than the second latency. The first latency may include a first round trip time (RTT) of a first packet communicated via the first communication link, and the second latency may include a second RTT of a second packet communicated via the second communication link.

Additionally, or alternatively, the first QoS indicator may include a first packet loss of the first communication link, the second QoS indicator may include a second packet loss of the second communication link, and the second QoS indicator may be equal or superior to the first QoS indicator if the first packet loss is equal to or greater than the second packet loss. Additionally, or alternatively, the first QoS indicator may include a first vector of QoS features, the second QoS indicator may include a second vector of QoS features, and the second QoS indicator may. be equal or superior to the first QoS indicator if a distance between the first vector of QoS features and the second vector of QoS features is equal to or smaller than a threshold value.

The program instructions, upon execution, may cause the IHS to, prior to aggregating the first and second communication links, verify the second QoS using a duplicate of a packet transmitted via the first communication link. Additionally, or alternatively, the program instructions, upon execution, may cause the IHS to, transmit a first subset of packets through the first communication link and a second subset of packets through the second communication link while the first QoS indicator and the second QoS indicator are within a selected range of values.

Additionally, or alternatively, the program instructions, upon execution, may cause the IHS to identify whether the first communication link is used by a first or second type of application, where the first type of application is associated with a first QoS threshold and the second type of application is associated with a second QoS threshold, and at least one of: in response to the first communication link being used by the first type of application, aggregate the first and second communication links if the second QoS indicator is superior to the first QoS indicator by the first QoS threshold, or in response to the first communication link being used by the second type of application, aggregate the first and second communication links if the second QoS indicator is superior to the first QoS indicator by the second QoS threshold.

Additionally, or alternatively, the program instructions, upon execution, may cause the IHS to identify a distance between a user and the IHS, and at least one of: in response to the distance being smaller than a selected value, aggregate the first and second communication links if the second QoS indicator is superior to the first QoS indicator by a first QoS threshold; or in response to the distance being greater than the selected value, aggregate the first and second communication links if the second QoS indicator is superior to the first QoS indicator by a second QoS threshold.

Additionally, or alternatively, the program instructions, upon execution, may cause the IHS to identify whether the IHS is in a first posture or a second posture, where the first posture is associated with a first QoS threshold and the second posture is associated with a second QoS threshold, and at least one of: in response to the IHS being in the first posture, aggregate the first and second communication links if the second QoS indicator is superior to the first QoS indicator by a first QoS threshold, or in response to the IHS being in the second posture, aggregate the first and second communication links if the second QoS indicator is superior to the first QoS indicator by a second QoS threshold.

Additionally, or alternatively, the program instructions, upon execution, may cause the IHS to: compare a third QoS indicator of a third communication link with the first or second QoS indicators; and in response to the third QoS indicator being equal or superior to the first or second QoS indicator, aggregate the first, second, and third communication links. Additionally, or alternatively, the program instructions, upon execution, may cause the IHS to, in response to the second QoS being inferior to the first QoS, segregate the second communication link from the first communication link.

In another illustrative, non-limiting embodiment, a memory device may have program instructions stored thereon that, upon execution by a processor of an IHS, cause the IHS to: determine that a first communication link is under contention; compare a first QoS indicator of the first communication link with a second QoS indicator of the second communication link, at least in part, in response to the determination; and aggregate the first and second communication links, at least in part, in response to the second QoS indicator being equal or superior to the first QoS indicator.

The program instructions, upon execution, may further cause the IHS to identify whether the first communication link is used by a first or second type of application, where the first type of application is associated with a first QoS threshold and the second type of application is associated with a second QoS threshold; and at least one of: in response to the first communication link being used by the first type of application, aggregate the first and second communication links if the second QoS indicator is superior to the first QoS indicator by the first QoS threshold; or in response to the first communication link being used by the second type of application, aggregate the first and second communication links if the second QoS indicator is superior to the first QoS indicator by the second QoS threshold.

Additionally, or alternatively, the program instructions, upon execution, further cause the IHS to: identify a distance between a user and the IHS; and at least one of: in response to the distance being smaller than a selected value, aggregate the first and second communication links if the second QoS indicator is superior to the first QoS indicator by a first QoS threshold; or in response to the distance being greater than the selected value, aggregate the first and second communication links if the second QoS indicator is superior to the first QoS indicator by a second QoS threshold.

In yet another illustrative, non-limiting embodiment, a method may include determining that a first communication link is under contention; comparing a first QoS indicator of the first communication link with a second QoS indicator of the second communication link, at least in part, in response to the determination; and aggregating the first and second communication links, at least in part, in response to the second QoS indicator being equal or superior to the first QoS indicator.

The method may also include identifying whether the first communication link is used by a first or second type of application, where the first type of application is associated with a first QoS threshold and the second type of application is associated with a second QoS threshold; and at least one of: in response to the first communication link being used by the first type of application, aggregating the first and second communication links if the second QoS indicator is superior to the first QoS indicator by the first QoS threshold; or in response to the first communication link being used by the second type of application, aggregating the first and second communication links if the second QoS indicator is superior to the first QoS indicator by the second QoS threshold.

The method may further include identifying a hinge angle indicative of an IHS posture; and at least one of: in response to the hinge angle being smaller than a selected value, aggregating the first and second communication links if the second QoS indicator is superior to the first QoS indicator by a first QoS threshold; or in response to the hinge angle being greater than the selected value, aggregating the first and second communication links if the second QoS indicator is superior to the first QoS indicator by a second QoS threshold.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods for adaptive multi-link control are described. In various embodiments, these systems and methods enable an Information Handling System (IHS) to push all traffic through a first communication link until contention is detected, and then simultaneously load a second communication link based on latency as a measure of link contention. More generally, these systems and methods may aggregate N links, where N is equal to or greater than two. In some implementations, an Operating System (OS) service may be configured to handle adaptive multi-link control enabling and/or disabling based on contention hysteresis over a selected time duration.

In some cases, systems and methods described herein may provide adaptive multi-link control that is personalized across devices, user, and system context. Additionally, or alternatively, certain systems and methods may define a point of multi-link advantage to thereby provide refined link aggregation, overall throughput advantages in congested environments, and additional throughput gains in non-congested environments. Generally, systems and methods described herein may enable multi-link operation in response to a determination that such operation achieves throughput benefits, and may disable multi-link operation in response to a subsequent determination that it does not.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
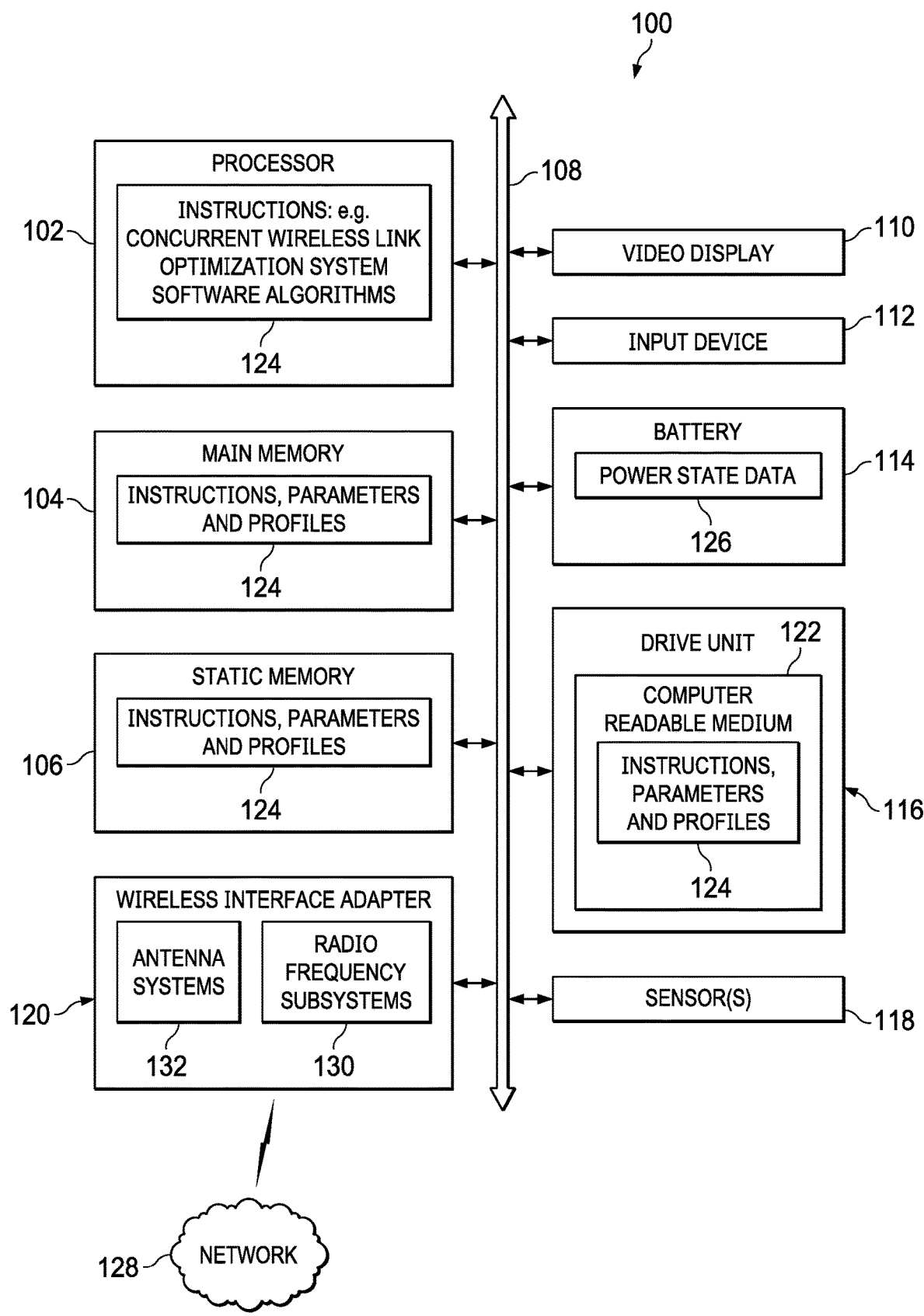
FIG. 1 is block diagram of an example of components of an Information Handling System (IHS) configured to implement adaptive multi-link control, according to some embodiments.

FIG. 1 is block diagram of an example of components of an Information Handling System (IHS) configured to implement adaptive multi-link control. In some embodiments IHS 100 may represent wireless communication devices 210, 220, and 230 or servers or systems 290 located anywhere within network 200 of FIG. 2, including remote data center 286.

Generally speaking, IHS 100 may represent a wireless communication device (e.g., a phone, a tablet, a watch, a laptop, etc.) associated with a user or recipient of intended wireless communication. The wireless communication device may execute instructions via a processor for a context aware radio resource management system including a concurrent wireless link optimization system. The context aware radio resource management or concurrent wireless link optimization system may operate as a software agent, in whole or in part, on the wireless communication device. IHS 100 may also represent a networked server or other system and administer aspects of the context aware radio resource management system including a concurrent wireless link optimization system via instructions executed on a processor.

As shown in FIG. 1, IHS 100 may include processor 102 such as a central processing unit (CPU), a graphics processing unit (GPU), or both. Moreover, IHS 100 can include main memory 104 and a static memory 106 that can communicate with each other via bus 108. As shown, IHS 100 may further include video display unit 110, such as a liquid crystal display (LCD), an organic light emitting diode (OLED), a flat panel display, a solid-state display, or other type of display system. Display 110 may include a touch screen display module and touch screen controller (not shown) for receiving user inputs to IHS 100. In some implementations, two displays may be coupled to each other via a hinge or the like.

Additionally, IHS 100 may include input device 112, such as a keyboard, and a cursor control device, such as a mouse or touchpad or similar peripheral input device. IHS 100 may also include a power source such battery 114 or an A/C power source. IHS 100 may also include disk drive unit 116 and sensor(s) 118. IHS 100 may include a network interface device such as wireless adapter 120. IHS 100 may also represent a server device whose resources can be shared by multiple client devices, or it can represent an individual client device, such as a desktop personal computer, a laptop computer, a tablet computer, or a mobile smartphone.

IHS 100 may include program instructions 124 that can be executed by processor 102 to cause the computer system to perform any one or more of the methods or operations disclosed herein. For example, instructions 124 may execute a network/communication link aggregation system coupled to a plurality of local area networks/communication links, and configured to provide concurrent wireless access between local area network components or clients, software agents, or other aspects or components. Similarly, instructions 124 may establish aggregated multiple wireless links and resources within local area network access points and client.

In some cases, instructions 124 may be executed for establishing aggregated links for concurrent operations within one or more wireless communication bands or other communication links such as WLAN, WiGig, Ethernet or the like. Additionally, or alternatively, instructions 124 may be executed for regulating aggregated transmission or reception along wireless channels or other channels within a local area network setting selected but which may occupy nearby, both physically and in frequency, wireless link channels.

Various software modules comprising program instructions 124 may be coordinated by an OS via an application programming interface (API). Examples of OSs may include WINDOWS, ANDROID, and other OS types known in the art. Examples of APIs include, but are not limited to: Win 32, Core Java API, or Android APIs. In a further example, processor 102 may conduct monitoring and processing of wireless communication device usage trends by IHS 100.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a PDA, a mobile IHS, a palmtop computer, a phone, a watch, a laptop computer, a desktop computer, a communications device, a wireless telephone, a land-line telephone, a control system, a camera, a scanner, a facsimile machine, a printer, a pager, a personal trusted device, a web appliance, an access point, a network router, switch or bridge, or any other machine capable of executing a set of instructions (sequential or otherwise) that specifies actions to be taken by that machine.

Disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. Disk drive unit 116 and static memory 106 also contain space for data storage. Further, instructions 124 may embody one or more of the methods or logic as described herein.

Wireless link quality or conditions may be monitored and measured by processor 102 during wireless link usage and stored. In a particular embodiment, instructions, parameters, and profiles 124 may reside completely, or at least partially, within main memory 104, static memory 106, and/or disk drive 116 during execution by processor 102. Main memory 104 and processor 102 may also include computer-readable media. Battery 114 may include a smart battery system that tracks and provides power state data 126. This power state data may be stored with instructions, parameters, and profiles 124.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency (RF) subsystems 130 with transmitter/receiver circuitry, wireless controller circuitry, amplifiers and other circuitry for wireless communications. Each RF subsystem 130 may communicate with one or more wireless technology protocols. RF subsystem 130 may contain individual subscriber identity module (SIM) profiles for each technology service provider and their available protocols. Alternatively, it may have a software-based SIM profile that is reconfigurable, or an eSIM for electronic control over an active SIM profile being used. Wireless adapter 120 may also include antenna system 132 which may include tunable antenna systems.

In some cases, wireless adapter 120 may operate two or more wireless communication links. For example, wireless adapter 120 may operate the two or more wireless communication links with a single, shared communication frequency band such as with the 5G standard relating to unlicensed wireless spectrum for small cell 5G next gen operation or for unlicensed Wi-Fi WLAN operation. For instance, a 5 GHz wireless communication frequency band may be apportioned under the 5G standards for communication on either small cell WWAN wireless link operation or Wi-Fi WLAN operation. In another example, wireless adapter 120 may operate a wireless communication link or links in unlicensed spectrum in 4.5G using protocols such as Licensed Assisted Access (LAA) or enhanced LAA (eLAA). In some embodiments, shared or aggregated wireless communication link(s) may be transmitted through one or a plurality of antennas.

In other cases, IHS 100 operating as a wireless communication device may operate a plurality of wireless adapters 120 for concurrent radio operation in one or more wireless communication bands. The plurality of wireless adapters 120 may further share a wireless communication band in some disclosed embodiments.

Wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Wireless adapter 120 may represent an add-in card, wireless network interface module that is integrated with a main board of HIS 100 or integrated with another wireless network interface capability, or any combination thereof.

In an embodiment, wireless adapter 120 may include one or more RF subsystems 130 including transmitters and wireless controllers for connecting via a multitude of wireless links. IHS 100 may have an antenna system transmitter 132 for 5G small cell WWAN, Wi-Fi WLAN or WiGig connectivity and one or more additional antenna system transmitters 132 for macro-cellular communication. RF subsystems 130 include wireless controllers to manage authentication, connectivity, communications, power levels for transmission, buffering, error correction, baseband processing, and other functions of wireless adapter 120.

RF subsystems 130 of wireless adapter 120 may measure various metrics relating to wireless communication pursuant to operation of a context aware radio resource management system. For example, the wireless controller of RF subsystem 130 may manage detecting and measuring received signal strength levels, bit error rates, signal to noise ratios, latencies, packet loss, congestion, contention, jitter, and other metrics or indicators relating to signal quality and strength. In an embodiment, a wireless controller may manage one or more RF subsystems 130 within wireless adapter 120.

The wireless controller also manages transmission power levels which directly affect RF subsystem power consumption. To detect and measure power consumption by RF subsystem 130, RF subsystem 130 may implement current and voltage measurements of power.

The wireless network may have a wireless mesh architecture in accordance with mesh networks described by the wireless data communications standards or similar standards. Wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In accordance with various embodiments, a computer-readable medium may include instructions, parameters, and profiles 124 or it may receive and execute instructions, parameters, and profiles 124 responsive to a propagated signal; so that a device connected to network 128 can communicate voice, video, or data over the network 128. Further, program instructions 124 may be transmitted or received over the network 128 via the network interface device or wireless adapter 120.

IHS 100 includes one or more application programs 124, and Basic Input/Output System and firmware (BIOS/FW) code 124. BIOS/FW code 124 functions to initialize IHS 100 on power up, to launch an operating system, and to manage input and output interactions between the operating system and the other elements of IHS 100. In an embodiment, BIOS/FW code 124 reside in memory 104, and include machine-executable code that is executed by processor 102 to perform various functions of IHS 100. In another embodiment, application programs and BIOS/FW code reside in another storage medium of IHS 100. For example, application programs and BIOS/FW code can reside in drive 116, in a ROM associated with IHS 100, in an option-ROM associated with various devices of IHS 100, in storage system 107, in a storage system associated with network channel of a wireless adapter 120, in another storage medium of IHS 100, or a combination thereof. Application programs 124 and BIOS/FW code 124 can each be implemented as single programs, or as separate programs carrying out the various operations described herein.

In some embodiments, a computer-readable medium may include a solid-state memory such as a memory card or other package that houses one or more non-volatile read-only memories. Further, a computer-readable medium may be a random-access memory or other volatile re-writable memory. Additionally, a computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment.

Sensors 118 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration, bag state (in or out of a bag), and/or lid sensor(s) (open or closed). In some cases, one or more sensors 118 may be a part of a keyboard or other input device 112. Processor 102 may be configured to process information received from sensors 118 and to perform context-based link aggregation operations.

For instance, during operation, the user may open, close, flip, swivel, or rotate display 110 to produce different IHS postures. In some cases, processor 102 may be configured to determine a current posture of IHS 100 using sensors 118. For example, in a dual-display IHS implementation, when a first display 110 (in a first IHS portion) is folded against a second display 110 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait). For each posture and/or hinge angle, processor(s) 201 may perform a different context-based link aggregation operation and/or use different thresholds for evaluating a point of multi-link advantage.

For example, in a laptop posture, a first display surface of a first display 110 may be facing the user at an obtuse angle with respect to a second display surface of a second display 110 or a physical keyboard portion. In a tablet posture, a first display 110 may be at a straight angle with respect to a second display 110 or a physical keyboard portion. And, in a book posture, a first display 110 may have its back resting against the back of a second display 110 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

Moreover, a different link aggregation operation may be performed based on other context information such as the presence or distance of the user with respect to IHS 100 and/or display 110. In these cases, processor 102 may process user presence data received by sensors 118 and may determine, for example, whether an IHS's end-user is present or absent.

In situations where the end-user is present before IHS 100, processor 102 may further determine a distance of the end-user from IHS 100 continuously or at pre-determined time intervals. The detected or calculated distances may be used by processor 102 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 110.

More generally, in various implementations, processor 102 may receive IHS context information using sensors 118 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user is operating the keyboard is typing with one or two hands (e.g., holding a stylus, or the like), a time of day, software application(s) under execution in focus for receiving keyboard input, whether IHS 100 is inside or outside of a carrying bag, etc. Moreover, a different link aggregation operation may be performed based on this context information.

In various embodiments, IHS 100 may not include all of the components shown in FIG. 1. Additionally, or alternatively, IHS 100 may include components in addition to those shown in FIG. 1. Additionally, or alternatively, components represented as discrete in FIG. 1 may be integrated with other components. For example, all or a portion of the functionality provided by the illustrated components may be implemented in a System-On-Chip (SOC), or the like.

Figure 2:
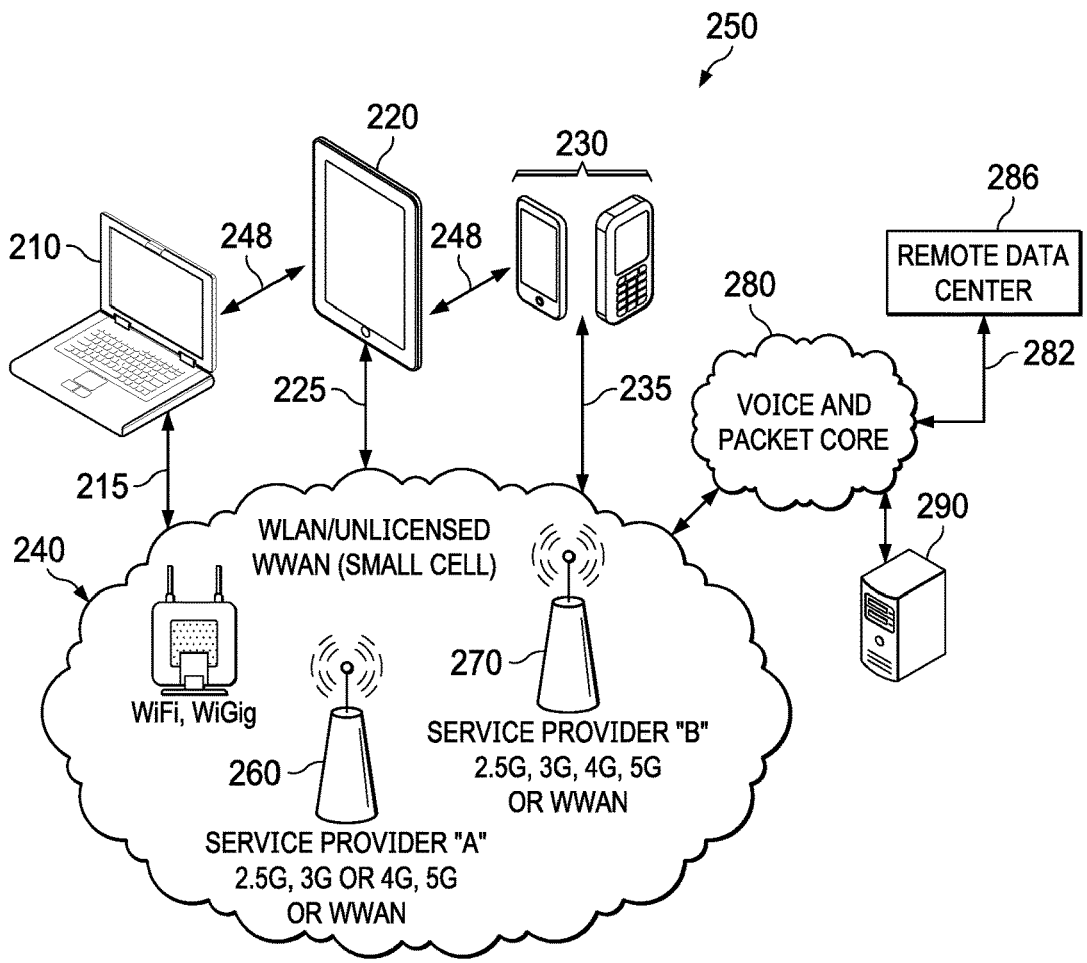
FIG. 2 is block diagram of a network environment where systems and methods for adaptive multi-link control may be implemented, according to some embodiments.

FIG. 2 is block diagram of a network environment where systems and methods for adaptive multi-link control may be implemented. In some embodiments, network 200 may include networked wireless communication devices 210, 220, and 230, wireless network access points, and multiple wireless connection link options. Network 200 may include one or more wired communication devices or links. For example, communication device 210 may include a wired link, such as an Ethernet link. A variety of additional computing resources of network 200 may include client mobile information handling systems, data processing servers 290, network storage devices, local and wide area networks, or other resources as needed or desired.

As depicted, IHSs 210, 220, and 230 may be a laptop computer, tablet computer, or smartphone device. Wireless communication devices 210, 220, and 230 may access a wireless local network 240, or they may access a macro-cellular network 250. In a further example, IHS 230, such as a laptop, may alternatively access local network 240 using a wired link, such as a wired Ethernet connection. In an example, the wireless local network 240 may be the wireless local area network (WLAN), a wireless personal area network (WPAN), or a wireless wide area network (WWAN).

In an embodiment, a standalone mobile IHS 210, 220, or 230 may operate on WLAN such as Wi-Fi or on unlicensed WWAN small cell wireless links such as with small cell unlicensed LTE substations in wireless local network 240. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments, networked wireless communication devices 210, 220, or 230 may have a plurality of wireless network interface systems capable of transmitting simultaneously within a shared communication frequency band. Communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Examples of competing protocols may be local wireless network access protocols such as Wi-Fi, WiGig, and small cell WLAN in an unlicensed, shared communication frequency band. Examples of communication frequency bands may include unlicensed 5 GHz frequency bands or 2.5 GHz conditional shared communication frequency bands under FCC Part 96. Wi-Fi ISM frequency bands that could be subject to future sharing include 2.4 GHz, 60 GHz, 900 MHz or similar bands.

Voice and packet core network 280 may contain externally accessible computing resources and connect to a remote data center 286. Voice and packet core network 280 may contain multiple intermediate web servers or other locations with accessible data. Voice and packet core network 280 may also connect to other wireless networks similar to 240 or 250 and additional wireless communication devices such as 210, 220, 230 or similar connected to those additional wireless networks.

Connection 282 between wireless network 240 and remote data center 286 or connection to other additional wireless networks may be via Ethernet or another similar connection to the world-wide-web, a WAN, a LAN, another WLAN, or other network structure. Connection 282 may be made via a WLAN access point/Ethernet switch to the external network and be a backhaul connection.

The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network-connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In various implementations, cloud or remote data center 286 or networked server 290 may run hosted applications for systems 210, 220, and 230. For example, remote data center 286, networked server 290, or some combination of both may operate some or all of a plurality of hosted applications. Wireless communication devices 210, 220, and 230 may be configured to run one or more applications locally, and to have hosted applications run in association with the local applications at remote data center 286 or networked server 290. For example, wireless communication devices 210, 220, and 230 may operate some or all of the hosted applications on a remote server via local area network connectivity using a link aggregation system among the plurality of local area networks in some embodiments.

Thus, as illustrated, systems 210, 220, and 230 may be running applications locally while requesting data objects related to those applications from the remote data center 286 via a wireless network. For example, a data storage client application such as Microsoft Sharepoint may run on system 220, and it may be associated with a host application running at remote data center 286 that represents a Sharepoint data storage server. In another example, a web browser application may be operating at system 230, and it may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (Wi-Fi or WiGig), through unlicensed WWAN small cell base stations such as in network 240 or through a service provider tower such as that shown with service provider A 260 or service provider B 270 and in network 250.

In other cases, wireless communication devices 210, 220, and 230 may communicate intra-device via 248 when one or more of wireless communication devices 210, 220, and 230 are set to act as an access point or a WWAN connection via small cell communication or licensed small cell WWAN connections. For example, one of wireless communication devices 210, 220, and 230 may serve as a Wi-Fi hotspot.

Quality-of-Service (QoS), bandwidth, time-of-flight (e.g., following the Fine Time Measurement or "FTM" protocol), and/or speed of wireless links 215, 225, and 235—that is, a link's capabilities—may vary widely depending on several factors including the service provider, the number of wireless communication devices and users in a location, and other factors. Thus, selection of a wireless link among local area network links such as WLAN links may depend on assessment of the link radio frequency conditions. The wireless communication device's operating context can play an important role in determining wireless link conditions. Information about wireless link connection quality and capacity for a service to be used can be advantageous in optimizing communication channel selection and/or multi-link aggregation.

Often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. These factors can be specific to the type of wireless service being requested, whether voice, messaging, SMTP, Audio, Video, HTTP or other service types. They can also be specific to the wireless communication device used. In each instance, radio frequency transmission subsystems and controllers operate and consume device power. Based on these, and other factors, systems and methods described herein may automatically select among aggregated local area network links to optimize radio frequency conditions, traffic conditions, device power consumption, cost, etc.

Figure 3:
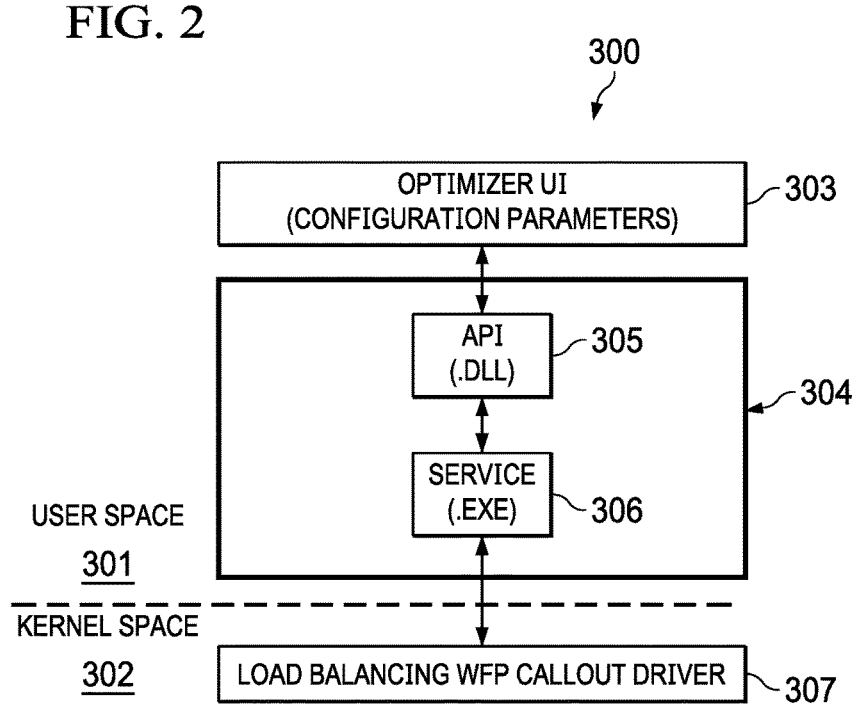
FIG. 3 is a block diagram of multi-link aggregation software modules configured to implement adaptive multi-link control, according to some embodiments.

FIG. 3 is a block diagram of multi-link aggregation software modules 300 configured to implement adaptive multi-link control. In some embodiments, software 300 may be instantiated through the execution of program instructions 124 by processor 102 of IHS 100. As shown, optimizer user interface (UI) 303 may provide a graphical UI (GUI) in user space 301 configured to receive one or more configuration parameters. For example, optimizer UI 303 may receive, as configuration parameters, a user's selection of QoS indicator(s), threshold(s), and/or context information (e.g., application type, proximity-based, posture-based, etc.), usable by software 300 to determine when to enable or disable multi-link aggregation features in IHS 100.

Optimizer UI passes configuration parameters to OS plug-in module 304, which includes API 305 (a dynamic-link library or DLL, etc.) and OS service 306 (e.g., an executable). In some implementations, OS service 306 may be configured to handle adaptive multi-link enabling in user space 301. In kernel space 302, callout driver 307 (e.g., Windows Filtering Platform (WFP)) may be configured to perform load balancing of packets for aggregated links under control of OS service 306, according to the configuration parameters received via optimizer UI 303.

In some implementations, software 300 may include machine learning (ML) and/or artificial intelligence (AI) algorithms configured to collect context information such as, for example, RSSI from various APs, ToF from various APs, physical location information (e.g., by GPS), accelerometer data, etc. Software 300 may also include ML and/or AI algorithms configured to store and analyze other context information indicative of user behavior, such applications under execution and their priorities, distance between the user and the IHS, IHS posture or hinge angle, bag status, etc. Moreover, software 300 may be configured to use such information to perform multi-link aggregation operations that are specific to that context.

Figure 4A:
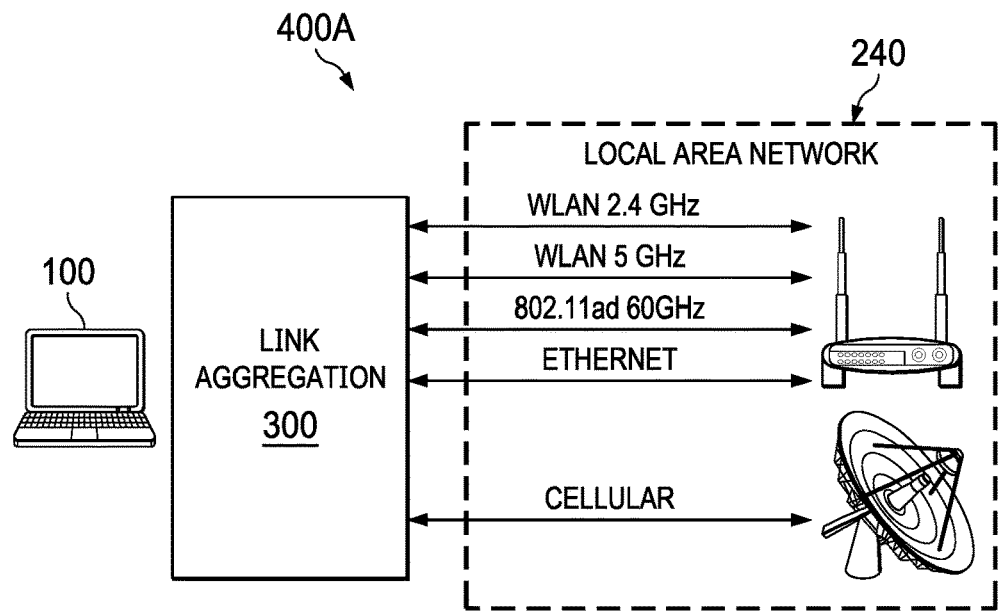
FIGS. 4A-C are block diagrams of use-case examples, according to some embodiments.
Figure 4B:
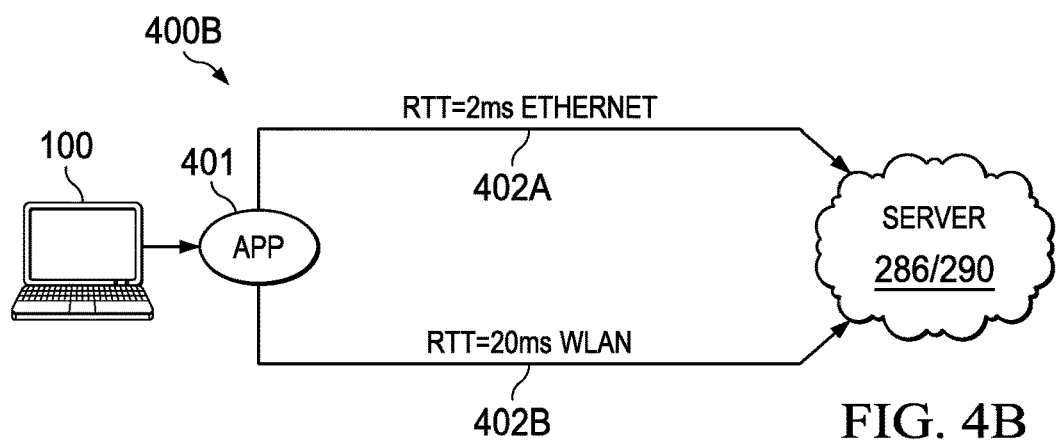
Figure 4C:
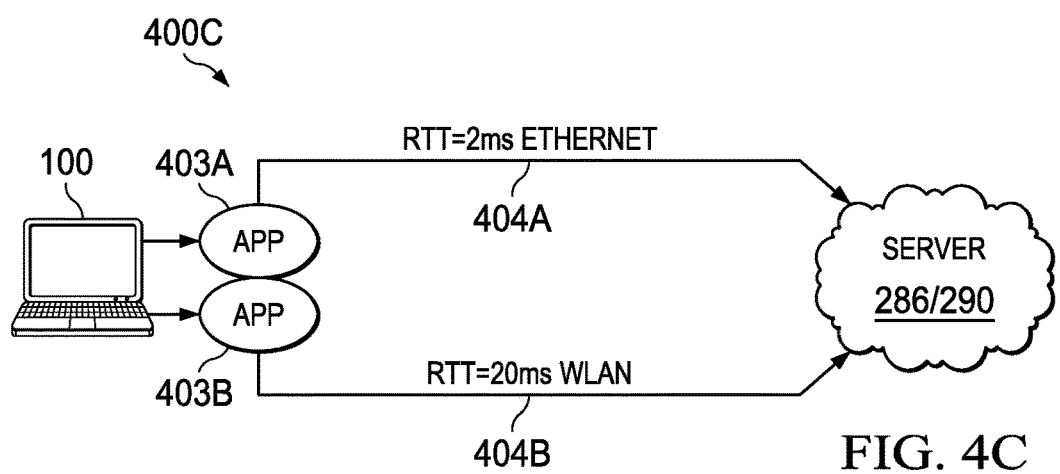

FIGS. 4A-C are block diagrams of use-case examples, according to some embodiments. Particularly, FIG. 4A shows environment 400A where IHS 100 executes multi-link aggregation software 300 to access local area network 240. Multi-link aggregation software 300 may be further configured to determine when to use single or multiple links (using multiple links is helpful only when the primary communication link is under contention), for example, using method 500 of FIG. 5.

Multi-link aggregation software 300 sends and receives information in the form of network packets through an access point of network 240 simultaneously through multiple network interfaces, such as a wired network interface (e.g., IP address 192.168.1.2:4243) and a wireless network interface (e.g., IP address 192.168.1.3:4243). The multiple network interfaces are coordinated by software 300 (and another instance of software 300 at the access point), which track coordinated network interfaces using a link aggregation table.

Multi-link aggregation software 300 may be configured to manage network packet address translation at the network layer. In one example, multi-link aggregation software 300 coordinates the use of multiple network interfaces without the use of specialized hardware. In another example, a digital signal processor (DSP) integrated into HIS 100 receives network packets from a given application that are prepared to send through a single network interface in a conventional manner. Such an application may have coordinated with an OS to communicate with the Internet through an Ethernet cable.

Multi-link aggregation software 300 receives the network packets from the application, selects a network interface to send the network packet, and performs a network layer address translation to insert an Internet Protocol address of the selected network interface into the network packet. Once the network packet is translated to a selected network address, multi-link aggregation software 300 places the network packet into the network interface device associated with the selected network interface and sends the network packet through that network interface to the access point.

Similar handling of incoming network packets provides a given application with access to multiple network interfaces to accept network packets. As network packets arrive at the two interfaces, the network packets are forwarded to multi-link aggregation software 300 where network address translation is performed to insert an Internet Protocol address in the network layer that is expected by the application. Inbound network packets with the translated network address expected by the application are then forwarded to that application for processing.

As such, an application may be provided with multiple network interfaces through network address translation so that the application views the multiple network interfaces as a single interface. In order to coordinate network communication for the application with an external network, the target of the application network packets should know that network packets from the application have the same source application even though the source Internet Protocol address reflects different network mediums of the client. For example, the access point may manage the assignment of Internet Protocol addresses so that an aggregated Internet Protocol address is presented for the application to the external network.

The access point may assign an Internet Protocol address to IHS 100 in a conventional manner, such as with a DHCP dynamic address process that leverages a globally unique address provided from an Internet Service Provider or enterprise server or a locally unique IP address like 192.168.x.x. The application coordinates external network communication using a network interface and associated Internet Protocol address assigned by an operating system. Multi-link aggregation software 300 then coordinates the use of multiple network interfaces by inserting aggregate Internet Protocol addresses with network address translation.

In an example, multi-link aggregation software 300 associates in a link aggregation table the Internet Protocol addresses of the two selected network interfaces (e.g., 192.168.1.2 and 192.168.1.3) with a port (e.g., 4243). The association is stored in the link aggregation table of the access point, where an aggregate Internet Protocol address (e.g., 41.126.22.35) and port (e.g., 3423) is also associated with the application and used through network address translation to present the application's network packets to an external network as from a same source address.

In some cases, a combination of peer-to-peer, mesh and WLAN network interfaces may all communicate network packets of a client application to a common location outbound to an external network so that one or more network address translations are performed at one more intermediate local area network locations before communication to the external network is performed using a common aggregated network layer Internet Protocol address. Ultimately, at egress to the external network, multiple Internet Protocol addresses of the local area network are coupled by the egress device, such as an access point, by advertising the multiple Internet Protocol addresses as a single public/private Internet Protocol address.

In FIG. 4B, example 400B shows application 401 executed by IHS 100 and having two available links 402A and 402B to server 286/290. In this case, using both links would not be advantageous until the latency (given by packet roundtrip time or RTT) of link 402A (Ethernet, 2 ms) is equal to or smaller than the latency of link 402B (WLAN, 20 ms). In various embodiments, once multi-link aggregation software 300 determines that the RTT of link 402A is equal to the RTT of link 402B (e.g., within a context-based threshold value), which indicates that link 402A is under contention, it may enable multi-link use so that application 401 can use both links 402A and 402B concurrently.

In FIG. 4C, example 400C shows two applications 403A and 403B executed by IHS 100 and having two respective links 404A and 404B to server 286/290. Again, using both links would not be advantageous to either application until the latency of link 402A (Ethernet, 2 ms) is equal to or smaller than the latency of link 402B (WLAN, 20 ms). When multi-link aggregation software 300 determines that the RTT of link 402A is equal to the RTT of link 402B (e.g., within a context-based threshold value), however, it may enable multi-link use so that applications 403A and 403B can use both links 402A and 402B concurrently.

Figure 5:
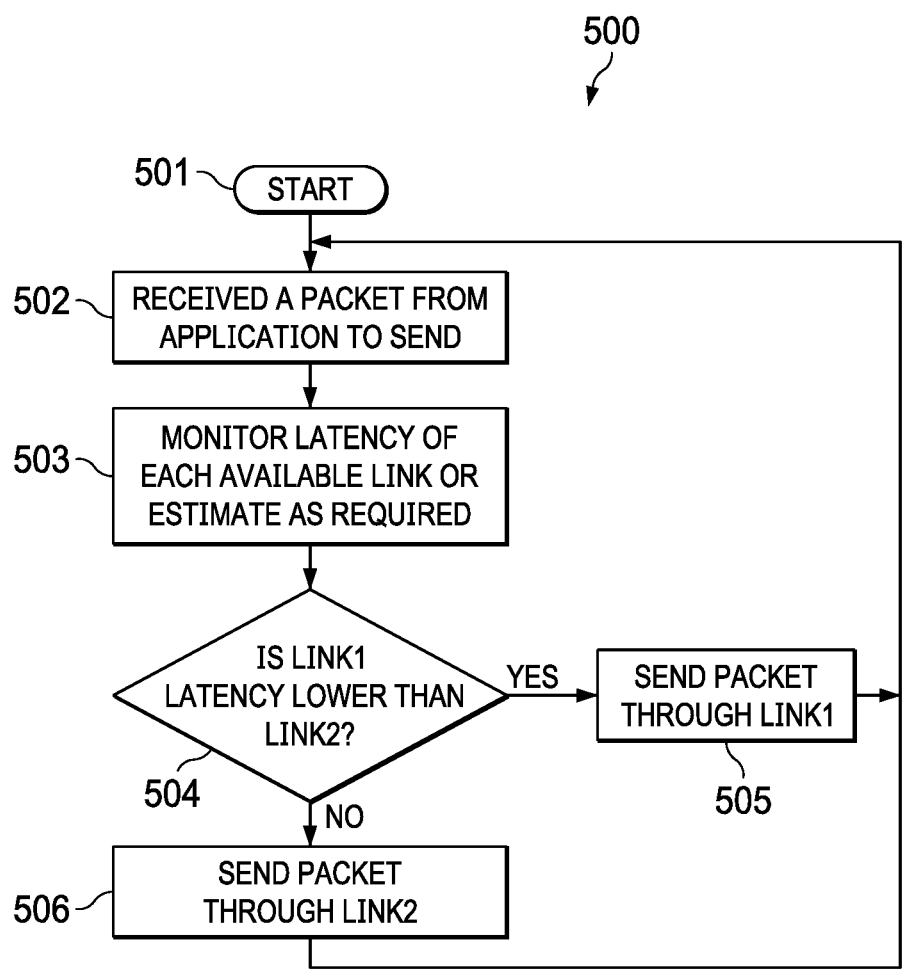
FIG. 5 is a flowchart of an example of a method for adaptive multi-link control, according to some embodiments.

FIG. 5 is a flowchart of an example of method 500 for adaptive multi-link control. In some embodiments, method 500 may be performed by IHS 100 in response to program instructions 124 being executed by processor 102. In this example, assume that there are two communications links available, the method being readily extendable to three or more links. As the inventors hereof have established, using a second communication link is useful only when the first communication link is congested or overloaded. In some cases, a first communication link can be overloaded either by a large number of clients or by a high bandwidth requirement of some clients. When under contention, an increase in load causes higher probability of packet collisions leading to drop in throughput per user exponentially.

In some implementations, latency (e.g., RTT in ms) may be used as a measure to detect whether a communication link is congested. When a first communication link's latency is observed to be higher than in its non-congested state (either based on previous connection or approximate spike benchmark for a given communications standard), then method 500 may check the latency estimate of the second communication link. If the latency estimate of second communication link is equal to or less the first communication link's, method 500 may start sending some packets (e.g., duplicate packets) over the second communication link and cross-check the second communication link's latency.

If the second communication link's latency meets the requirement of being less than or equal as the first communication link's latency, method 500 may perform water filling of packets to maintain latency same over both communication links. The same procedure may be extended when more than 2 links are available.

Still referring to FIG. 5, method 500 starts a block 501. At block 502, method 500 may receive a packet from an application to be sent to a remote IHS. At block 503, method 500 may monitor a QoS (e.g., latency) of each available link or it may estimate it, as required, with hysteresis filtering on the latency computation. If block 504 determines that the latency of a first communication link is lower than the latency of a second communication link, method 500 may send the packet through the first communication link at bock 505. Conversely, if block 504 determines that the latency of the second communication link is lower than the latency of the first communication link (an indication that the first communication link is under contention), method 500 may send the packet through the second communication link at block 506.

In other cases, as part of block 503, method 500 may determine whether a first communication link is under contention, for example, by comparing a first QoS indicator against a contention threshold (e.g., maximum acceptable RTT, etc.). If so, block 504 may compare QoS indicators for the first communication link and a second communication link, at least in part, based on context information received from sensors 118 (e.g., proximity, IHS posture, etc.).

With respect to block 504, method 500 may determine whether the second communication link's QoS indicator is equal or superior to the first communication link's QoS indicator. In some cases, the first QoS indicator may include a first latency of the first communication link, the second QoS indicator may include a second latency of the second communication link, and the second QoS indicator is equal or superior to the first QoS indicator if the first latency is equal to or greater than the second latency. Additionally, or alternatively, the first QoS indicator may include a first packet loss of the first communication link, the second QoS indicator may include a second packet loss of the second communication link, and the second QoS indicator is equal or superior to the first QoS indicator if the first packet loss is equal to or greater than the second packet loss.

In some cases, in response to the first communication link being used by a first type of application (e.g., download vs. media playing vs. gaming vs. video/audio conferencing), method 500 may aggregate the first and second communication links if the second QoS indicator is superior to the first QoS indicator by a first QoS threshold, as determined in block 504. In response to the first communication link being used by the second type of application, however, block 504 may aggregate the first and second communication links if the second QoS indicator is superior to the first QoS indicator by a second QoS threshold that is different from the first QoS threshold.

Additionally, or alternatively, in response to a distance between the user and IHS 100 being smaller than a selected value (e.g., near-field), method 500 may aggregate the first and second communication links if the second QoS indicator is superior to the first QoS indicator by a first QoS threshold. In response to the distance being greater than the selected value (e.g., far-field), method 500 may aggregate the first and second communication links if the second QoS indicator is superior to the first QoS indicator by a second QoS threshold that is different from the first QoS threshold.

Additionally, or alternatively, in response to IHS 100 being in a first posture (e.g., laptop mode), method 500 may aggregate the first and second communication links if the second QoS indicator is superior to the first QoS indicator by a first QoS threshold. In response to IHS 100 being in a second posture (e.g., display mode), method 500 may aggregate the first and second communication links if the second QoS indicator is superior to the first QoS indicator by a second QoS threshold that is different from the first QoS threshold.

In some embodiments, the first QoS indicator may include a first vector of two or more QoS features, and the second QoS indicator may include a second vector of two or more QoS features. In those embodiments, the second QoS indicator is equal or superior to the first QoS indicator if a distance (e.g., Euclidean distance) between the first vector of QoS features and the second vector of QoS features is equal to or smaller than a threshold value.

If method 500 determines that the second communication link's QoS indicators are inferior to the first communication link's QoS indicators, method 500 segregates the second communication link from the first communication link.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to:
   determine that a first communication link is under contention;
   compare a first quality-of-service (QoS) indicator of the first communication link with a second QoS indicator of a second communication link, at least in part, in response to the determination, wherein the first QoS indicator comprises a first vector of QoS features and the second QoS indicator comprises a second vector of QoS features; and
   aggregate the first and second communication links, at least in part, in response to a difference between the first vector of QoS features and the second vector of QoS features being equal to or smaller than a threshold value.

2. The IHS of claim 1, wherein the first and second communication links are of different types selected from a group consisting of: a WiFi link, an Ethernet link, and a cellular link.

3. The IHS of claim 1, wherein to determine that the first communication link is under contention, the program instructions, upon execution by the processor, further cause the IHS to compare the first QoS indicator against a contention metric.

4. The IHS of claim 1, wherein the first QoS indicator comprises a first latency of the first communication link, wherein the second QoS indicator comprises a second latency of the second communication link, and wherein the program instruction, upon execution, cause the IHS to aggregate the first and second communication links further in response to the first latency being equal to or greater than the second latency.

5. The IHS of claim 4, wherein the first latency comprises a first round trip time (RTT) of a first packet communicated via the first communication link, and wherein the second latency comprises a second RTT of a second packet communicated via the second communication link.

6. The IHS of claim 1, wherein the first QoS indicator comprises a first packet loss of the first communication link, wherein the second QoS indicator comprises a second packet loss of the second communication link, and wherein the if program instruction, upon execution, cause the IHS to aggregate the first and second communication links further in response to the first packet loss being equal to or greater than the second packet loss.

7. The IHS of claim 1, wherein the program instructions, upon execution, further cause the IHS to, prior to the aggregation of the first and second communication links, verify the second QoS indicator using a duplicate of a packet transmitted via the first communication link.

8. The IHS of claim 1, wherein the program instructions, upon execution, further cause the IHS to, transmit a first subset of packets through the first communication link and a second subset of packets through the second communication link while the first QoS indicator and the second QoS indicator are within a selected range of values.

9. The IHS of claim 1, wherein the program instructions, upon execution, further cause the IHS to:
identify whether the first communication link is used by a first or second type of application, wherein the first type of application is associated with a first QoS threshold and the second type of application is associated with a second QoS threshold; and
at least one of:
aggregate the first and second communication links further in response to the first communication link being used by the first type of application and the second QoS indicator being superior to the first QoS indicator by the first QoS threshold; or
aggregate the first and second communication links further in response to the first communication link being used by the second type of application and the second QoS indicator being superior to the first QoS indicator by the second QoS threshold.

10. The IHS of claim 1, wherein the program instructions, upon execution, further cause the IHS to:
identify a distance between a user and the IHS; and
at least one of:
aggregate the first and second communication links further in response to the distance being smaller than a selected value and the second QoS indicator being superior to the first QoS indicator by a first QoS threshold; or
aggregate the first and second communication links further in response to the distance being greater than the selected value and the second QoS indicator being superior to the first QoS indicator by a second QoS threshold.

11. The IHS of claim 1, wherein the program instructions, upon execution, further cause the IHS to:
identify whether the IHS is in a first posture or a second posture, wherein the first posture is associated with a first QoS threshold and the second posture is associated with a second QoS threshold; and
at least one of:
aggregate the first and second communication links further in response to the IHS being in the first posture and the second QoS indicator being superior to the first QoS indicator by the first QoS threshold; or
aggregate the first and second communication links further in response to the IHS being in the second posture the second QoS indicator being superior to the first QoS indicator by the second QoS threshold.

12. The IHS of claim 1, wherein the program instructions, upon execution, further cause the IHS to:
compare a third QoS indicator of a third communication link with the first or second QoS indicators; and
in response to the third QoS indicator being equal or superior to the first or second QoS indicator, aggregate the first, second, and third communication links.

13. The IHS of claim 1, wherein the program instructions, upon execution, further cause the IHS to, in response to the second QoS indicator being inferior to the first QoS indicator, segregate the second communication link from the first communication link.

14. A memory device having program instructions stored thereon that, upon execution by a processor of an Information Handling System (IHS), cause the IHS to:
determine that a first communication link is under contention;
compare a first quality-of-service (QoS) indicator of the first communication link with a second QoS indicator of a second communication link, at least in part, in response to the determination;
identify a distance between a user and the IHS; and
at least one of:
in response to the distance being smaller than a selected value, aggregate the first and second communication links if the second QoS indicator is superior to the first QoS indicator by a first QoS threshold; or
in response to the distance being greater than the selected value, aggregate the first and second communication links if the second QoS indicator is superior to the first QoS indicator by a second QoS threshold.

15. The memory device of claim 14, wherein the program instructions, upon execution, further cause the IHS to:
identify whether the first communication link is used by a first or second type of application, wherein the first type of application is associated with the first QoS threshold and the second type of application is associated with the second QoS threshold; and
at least one of:
aggregate the first and second communication links further in response to the first communication link being used by the first type of application and the second QoS indicator being superior to the first QoS indicator by the first QoS threshold; or
aggregate the first and second communication links further in response to the first communication link being used by the second type of application and the second QoS indicator being superior to the first QoS indicator by the second QoS threshold.

16. A method, comprising:
determining that a first communication link is under contention;
comparing a first quality-of-service (QoS) indicator of the first communication link with a second QoS indicator of a second communication link, at least in part, in response to the determination;
identifying whether an Information Handling System (IHS) is in a first posture or a second posture, wherein the first posture is associated with a first QoS threshold and the second posture is associated with a second QoS threshold; and
at least one of:
in response to the IHS being in the first posture, aggregating the first and second communication links if the second QoS indicator is superior to the first QoS indicator by the first QoS threshold; or
in response to the IHS being in the second posture, aggregating the first and second communication links if the second QoS indicator is superior to the first QoS indicator by the second QoS threshold.

17. The method of claim 16, further comprising:
identifying whether the first communication link is used by a first or second type of application, wherein the first type of application is associated with the first QoS threshold and the second type of application is associated with the second QoS threshold; and
at least one of:
aggregating the first and second communication links further in response to the first communication link being used by the first type of application and the second QoS indicator being superior to the first QoS indicator by the first QoS threshold; or aggregating the first and second communication links further in response to the first communication link being used by the second type of application and the second QoS indicator being superior to the first QoS indicator by the second QoS threshold.

18. The method of claim 16, wherein identifying whether the IHS is in the first posture or the second posture further comprises identifying a hinge angle.

* * * * *